US012599124B2

(12) United States Patent
Hiller

(10) Patent No.: US 12,599,124 B2
(45) Date of Patent: Apr. 14, 2026

(54) SPORTING DOWEL ROD

(71) Applicant: Hangry Brand Enterprises, L.L.C., Brighton, MI (US)

(72) Inventor: Michael J. Hiller, Brighton, MI (US)

(73) Assignee: Hangry Brand Enterprises, L.L.C., Brighton, MI (US)

( * ) Notice: Subject to any disclaimer, the term of this patent is extended or adjusted under 35 U.S.C. 154(b) by 156 days.

(21) Appl. No.: 18/483,767

(22) Filed: Oct. 10, 2023

(65) Prior Publication Data

US 2024/0114891 A1     Apr. 11, 2024

Related U.S. Application Data

(60) Provisional application No. 63/414,721, filed on Oct. 10, 2022.

(51) Int. Cl.
A01M 31/00 (2006.01)
F41B 15/02 (2006.01)

(52) U.S. Cl.
CPC ........... A01M 31/006 (2013.01); F41B 15/02 (2013.01)

(58) Field of Classification Search
CPC .............................. A01M 31/006; F41B 15/02
See application file for complete search history.

(56) References Cited

U.S. PATENT DOCUMENTS

| | | | | | |
|---|---|---|---|---|---|
| 4,828,307 | A | * | 5/1989 | Sokol | B65G 7/12 452/192 |
| 6,142,547 | A | * | 11/2000 | Bowerman | A01K 27/003 294/142 |
| 6,457,763 | B2 | * | 10/2002 | Cornelius | A01M 31/00 294/153 |
| 8,292,341 | B1 | * | 10/2012 | Sokoly | A01M 31/006 224/184 |
| 8,616,601 | B1 | * | 12/2013 | Coughlin | A01M 31/006 452/189 |
| 2004/0253908 | A1 | * | 12/2004 | Thiry | A01K 15/025 446/491 |
| 2006/0194634 | A1 | * | 8/2006 | Maor | F41B 15/02 463/47.2 |
| 2006/0254570 | A1 | * | 11/2006 | Dillon | F41B 11/62 124/69 |
| 2008/0020850 | A1 | * | 1/2008 | Stethem | F41B 15/02 463/47.2 |

* cited by examiner

*Primary Examiner* — Derek J Battisti
(74) *Attorney, Agent, or Firm* — Howard & Howard Attorneys PLLC

(57) ABSTRACT

A sporting dowel rod is provided. The sporting dowel rod includes an elongated rod including a first end portion and a second end portion distal from the first end portion. The sporting dowel rod further includes a first handle attached to the first end portion and a second handle removably attached to the second end portion. The sporting dowel rod is configured to operate as an aider to a user for dragging or hanging a game animal when the second handle is attached to the second end portion. The sporting dowel rod is configured to operate as a billy-club when the second hand is removed from the second end portion.

17 Claims, 11 Drawing Sheets

SPORTING DOWEL ROD

CROSS-REFERENCE TO RELATED APPLICATION

The subject patent application claims priority to and all of the benefits of U.S. Provisional Patent Application No. 63/414,721 filed on Oct. 10, 2022, the disclosure of which is hereby incorporated by reference in its entirety.

INTRODUCTION

The disclosure generally relates to a sporting dowel rod. In one embodiment, the disclosure relates to an anodized metal shaft for harvesting animals in which the main apparatus is constructed of lightweight metal.

Aiders (i.e., hand held drags and stringers) for hunting and fishing, which are attached to the animal, may be used to recreationally harvest animals. Aiders may be configured for making the transportation of a harvested animal easier than carrying the animal by hand.

Aiders may be utilized in conjunction with rope, cable, or other similar flexible attachment mechanism. Aiders may vary by weight, durability, longevity, color variability, and ergonomics.

SUMMARY

A sporting dowel rod is provided. The sporting dowel rod includes an elongated rod including a first end portion and a second end portion distal from the first end portion. The sporting dowel rod further includes a first handle attached to the first end portion and a second handle removably attached to the second end portion. The sporting dowel rod is configured to operate as an aider to a user for dragging or hanging a game animal when the second handle is attached to the second end portion. The sporting dowel rod is configured to operate as a billy-club when the second hand is removed from the second end portion.

In some embodiments, the first handle is removably attached to the first end portion.

In some embodiments, the elongated rod includes a first link attachment feature disposed upon the first end portion and a second link attachment feature disposed upon the second end portion.

In some embodiments, wherein the first link attachment feature and the second link attachment feature each include a through-hole formed in the elongated rod.

In some embodiments, the elongated rod includes a circumferential gripping feature including an annular depressed ring formed in the elongated rod.

In some embodiments, the elongated rod includes one of a circular cross-section, a triangular cross-section, and a square cross-section.

In some embodiments, the second handle includes a constriction band configured for selectively releasing the second handle from the elongated rod.

In some embodiments, the first handle and the second handle are each constructed of an elastic polymer.

In some embodiments, the first handle and the second handle are configured to move along and be selectively secured at a plurality of locations along the elongated rod.

According to one alternative embodiment, a system for dragging or hanging a game animal is provided. The system includes a sporting dowel rod. The sporting dowel rod includes an elongated rod including a first end portion and a second end portion distal from the first end portion. The sporting dowel rod further includes a first handle attached to the first end portion and a second handle removably attached to the second end portion. The system further includes a cord configured for attachment to the sporting dowel rod. The sporting dowel rod is configured to operate as an aider to a user for dragging or hanging a game animal when the second handle is attached to the second end portion. The sporting dowel rod is configured to operate as a billy-club when the second hand is removed from the second end portion.

In some embodiments, the elongated rod includes two link attachment features configured for enabling attachment of the cord to the elongated rod.

In some embodiments, the two link attachment features each include a through-hole formed in the elongated rod.

In some embodiments, the first handle is removably attached to the first end portion.

In some embodiments, the elongated rod includes a circumferential gripping feature including an annular depressed ring formed in the elongated rod.

In some embodiments, the elongated rod includes one of a circular cross-section, a triangular cross-section, and a square cross-section.

In some embodiments, the second handle includes a constriction band configured for selectively releasing the second handle from the elongated rod.

In some embodiments, the first handle and the second handle are each constructed of an elastic polymer.

In some embodiments, the first handle and the second handle are configured to move along and be selectively secured at a plurality of locations along the elongated rod.

According to one alternative embodiment, a method for dragging a game animal is provided. The method includes connecting a cord to each end of a sporting dowel rod. The sporting dowel rod includes an elongated rod including a first end portion, a second end portion distal from the first end portion a first link attachment feature disposed at the first end portion, and a second link attachment feature disposed at the second end portion. The sporting dowel rod further includes a first handle attached to the first end portion and a second handle attached to the second end portion. The method further includes connecting the cord to the game animal and applying motive force to the game animal through the cord and the sporting dowel rod.

The above features and advantages and other features and advantages of the present disclosure are readily apparent from the following detailed description of the best modes for carrying out the disclosure when taken in connection with the accompanying drawings.

DETAILED DESCRIPTION

Figure 1:
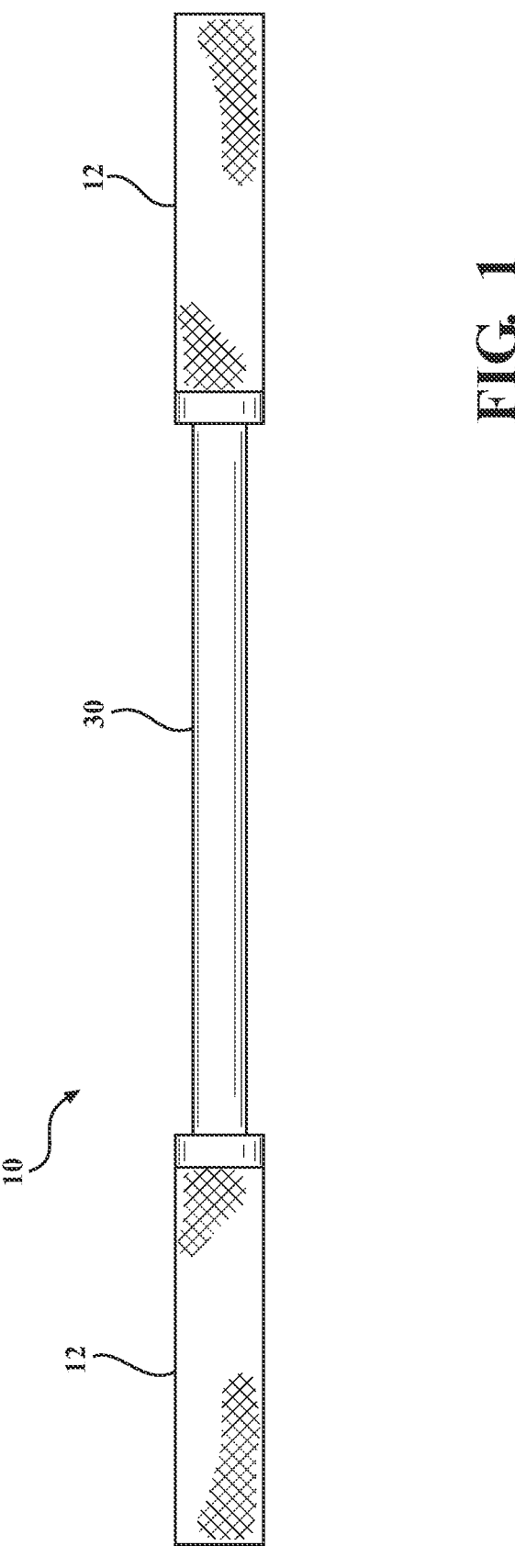
FIG. 1 schematically illustrates a sporting dowel rod including an elongated rod and two handles attached thereto, with the sporting dowel rod being configured as an aider, in accordance with the present disclosure.

A sporting dowel rod configured for use as an aider is provided. The sporting dowel rod or the disclosed device may include an elongated rod with a first end and a second end distal from the first end. The elongated rod may include a circular through attachment point formed at each of the distal ends, such that a rope, cable, or other similar attachment means may be secured through the circular through attachment points and additionally attached to a harvested animal. The sporting dowel rod may include one or two ergonomic handles attached to the elongated rod.

The ergonomic handle or handles may be adjustable. The ergonomic handle or handles may rotate relative to the elongated rod. The ergonomic handle or handles may be configured to translate along a longitudinal length of the elongated rod, for example, with the two handles being configurable to be at opposite distal portions near the distal ends of the elongated rod and with the same two handles being configurable to be moved together to be side-by-side at a center portion of the elongated rod or side-by-side at one end of the elongated rod. In another embodiment, one or more handles may be selectively removable and/or reversible. Reversible handles enable a user to select between gripping the sporting dowel rod with both hands with the user's thumbs pointed toward each other or alternatively with both thumbs pointing in a same direction.

In one embodiment, the elongated rod may be configured for receiving commercially available handles, such as handles available for use upon bicycle or motorcycle handlebars.

One or more handles may be attached to the elongated rod. The handle may be permanently attached to the elongated rod through welding, adhesive, threaded fastener, rivet, or other similar attachment means. The handle may be removably attached to the elongated rod, for example, with a removable or adjustable threaded fastener, a spring-loaded retention feature, elasticity of the handle material, or other similar removable attachment means being used to temporarily secure the handle to the elongated rod.

Animals may be caught, for example, as a fish on a fishing line with an intention to release the animal after the animal is caught by the user (i.e., catch and release). In other circumstances, the use may intend to harvest the animal for food, taking the fur of the animal, creating a decorative trophy with the animal, etc. Fish may have teeth, a sharp pointed bill, and/or sharp spines. An animal may have teeth, tusks, horns, kicking legs, quills, spraying glands, and/or other defense mechanisms. In the circumstances that the animal is to be harvested, it is desirable to quickly and efficiently cull or euthanize the animal to avoid injury to the user and avoid suffering of the animal over an extended period.

The disclosed sporting dowel rod may be configured as a billy-club or a bludgeoning instrument for use in culling the animal. In one example, the device may be initially configured with one handle attached to a first end of the elongated rod, and the device may be attached to a belt or held within a sheath or holder. Upon catching or partially subduing an animal, the user may grip the device and use it to cull the animal. Upon the animal being culled, the user may attach a second handle and a rope to the elongated rod. The user may then attach the rope to the animal and utilize the device to lift and/or drag the animal to another location.

In one embodiment, a first handle may be attached permanently to the elongated rod to enable efficient and stable use of the device as a billy-club, and a second handle may be kept nearby such that it may be removably attached to the device for use in transporting a culled animal. In one embodiment, a rope may be attached to the first end of the device with the one handle, for example, permitting the billy-club configuration of the device to be stored on a hook or a belt, and, upon transitioning to the aider configuration, the rope may be connected to the second end of the device.

The elongated rod may be straight. The elongated rod may have a circular cross-section, with the overall shape of the elongated rod being a cylinder. The elongated rod may have other cross-sectional shapes, for example, including a square or a triangular cross-section. The elongated rod may be curved, for example, with the elongated rod including a smoothly curved bow shape. In another example, in a configuration similar to a weightlifting curl bar, the elongated rod may include an overall straight, cylindrical shape, with a central portion of the dowel rod including bent, knurled hand grips to improve ergonomic factors for use of the sporting dowel rod.

An outer surface of the elongated rod may be smooth, for example, with a machined or chrome finish. The outer surface of the elongated rod may be textured, for example, providing a rough surface to which a handle may efficiently grip. The elongated rod may include one or more grooves or channels cut or otherwise formed upon a surface of the elongated rod. In one embodiment, the elongated rod may include three grooves formed radially side-by-side at a center portion of the elongated rod.

The elongated rod may be formed with a variety of materials. The elongated rod may be constructed with aluminum. The elongated rod may be constructed with anodized aluminum. Anodization is an electrochemical process, wherein a stable film or coating is applied to surface of a metal. An anodized metal may include an inorganic coating which may exhibit excellent scratch resistance and hardness. An anodized aluminum elongated rod may be produced in a variety of consumer satisfying colors. The device including an elongated rod formed with anodized aluminum provides excellent strength, light weight, and resistance to scratches and corrosion. The elongated rod may be formed with titanium or other similar metallic material. The elongated rod may be formed with steel, for example, stainless tubular steel with a hollow center to reduce weight of the elongated rod. The elongated rod may be formed with wood. The elongated rod may be formed with plastic or a polymer.

The device may further include an attachable shoulder harness useful for enabling the user to carry or apply force to the device upon the shoulders of the user.

Figures 2, 3:
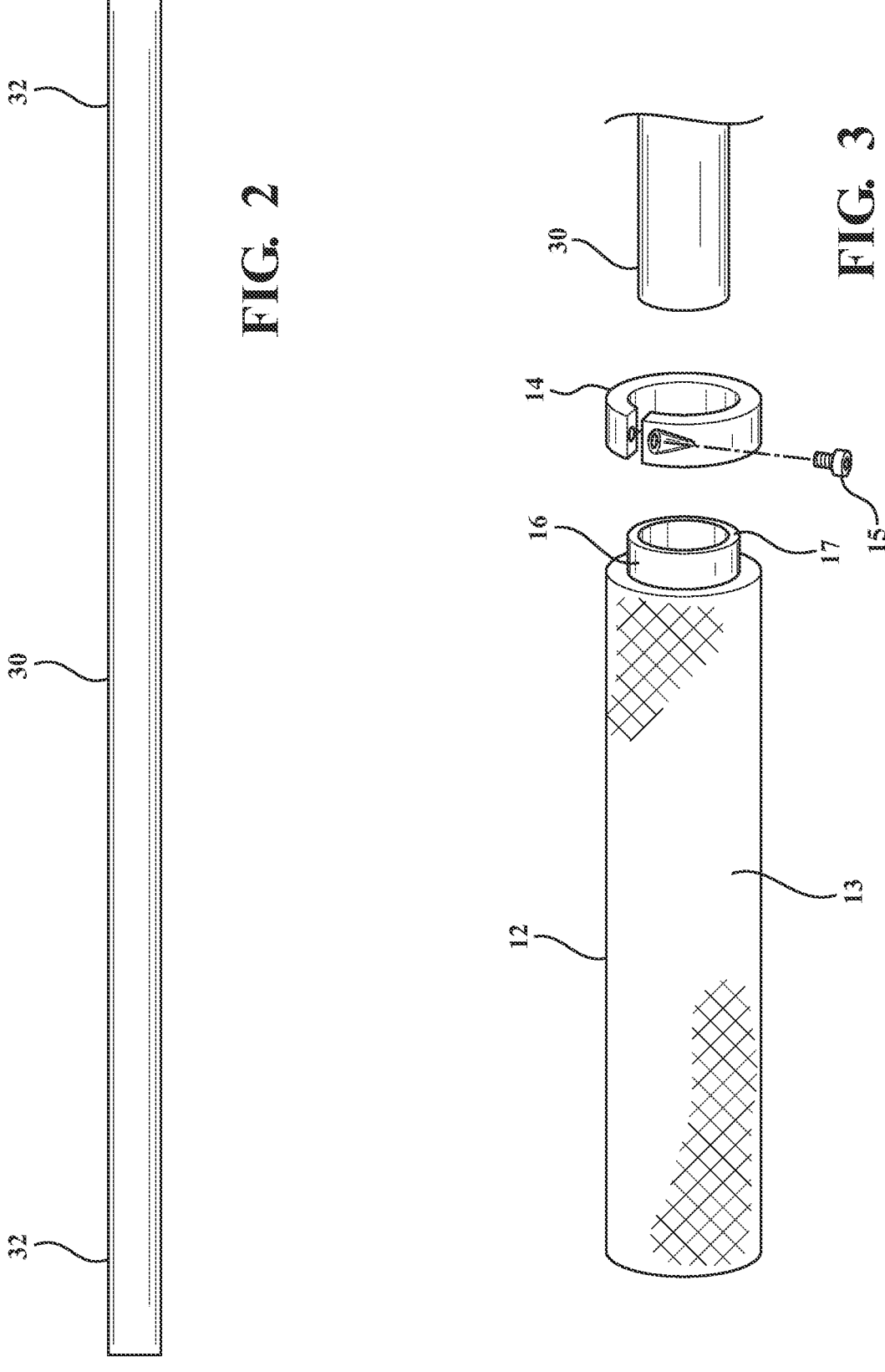
FIG. 2 schematically illustrates the elongated rod of the sporting dowel rod of FIG. 1, in accordance with the present disclosure.
FIG. 3 schematically illustrates one of the handles of the sporting dowel rod of FIG. 1, including a constriction band useful to secure the handle to the elongated rod, in accordance with the present disclosure.

Referring now to the drawings, wherein like reference numbers refer to like features throughout the several views, FIG. 1 schematically illustrates a sporting dowel rod 10 including an elongated rod 30 and two handles 12 attached thereto, with the sporting dowel rod 10 being configured as an aider. The elongated rod 30 is an exemplary straight cylinder with a circular cross-section. A user may tie or otherwise secure an attachment link to the elongated rod 30, such as a metallic hook useful to hold up a fish or a metallic chain useful to drag a large animal such as an elk or a black bear. One or both of the handles 12 may be permanently attached to the elongated rod 30. One or both of the handles 12 may be removably attached to the elongated rod 30. FIG. 2 schematically illustrates the elongated rod 30 of the sporting dowel rod 10 of FIG. 1. The elongated rod 30 is illustrated including a first end 32 and a second end 34.

FIG. 3 schematically illustrates one of the handles 12 of the sporting dowel rod of FIG. 1, including a constriction band 14 useful to secure the handle 12 to the elongated rod 30. The handle 12 includes an exemplary polymerized handle body 13. The polymerized handle body 13 may include various shapes and surface textures. The polymerized handle body 13 includes a hollow central portion 17 configured to receive the elongated rod 30. The polymerized handle body 13 further includes a narrow portion 16 configured to match to an internal diameter of the constriction band 14. The constriction band 14 is configured to receive a threaded set screw 15 configured to secure the constriction band 14 around the narrow portion 16 and apply a compressive force upon the narrow portion 16 and the elongated rod 30 under the narrow portion 16, thereby securing the handle 12 to the elongated rod 30. If the user desires to move or remove the handle 12, he or she may loosen the threaded set screw 15 and reduce or eliminate compressive force applied to the narrow portion 16 and the elongated rod 30.

Figure 4:
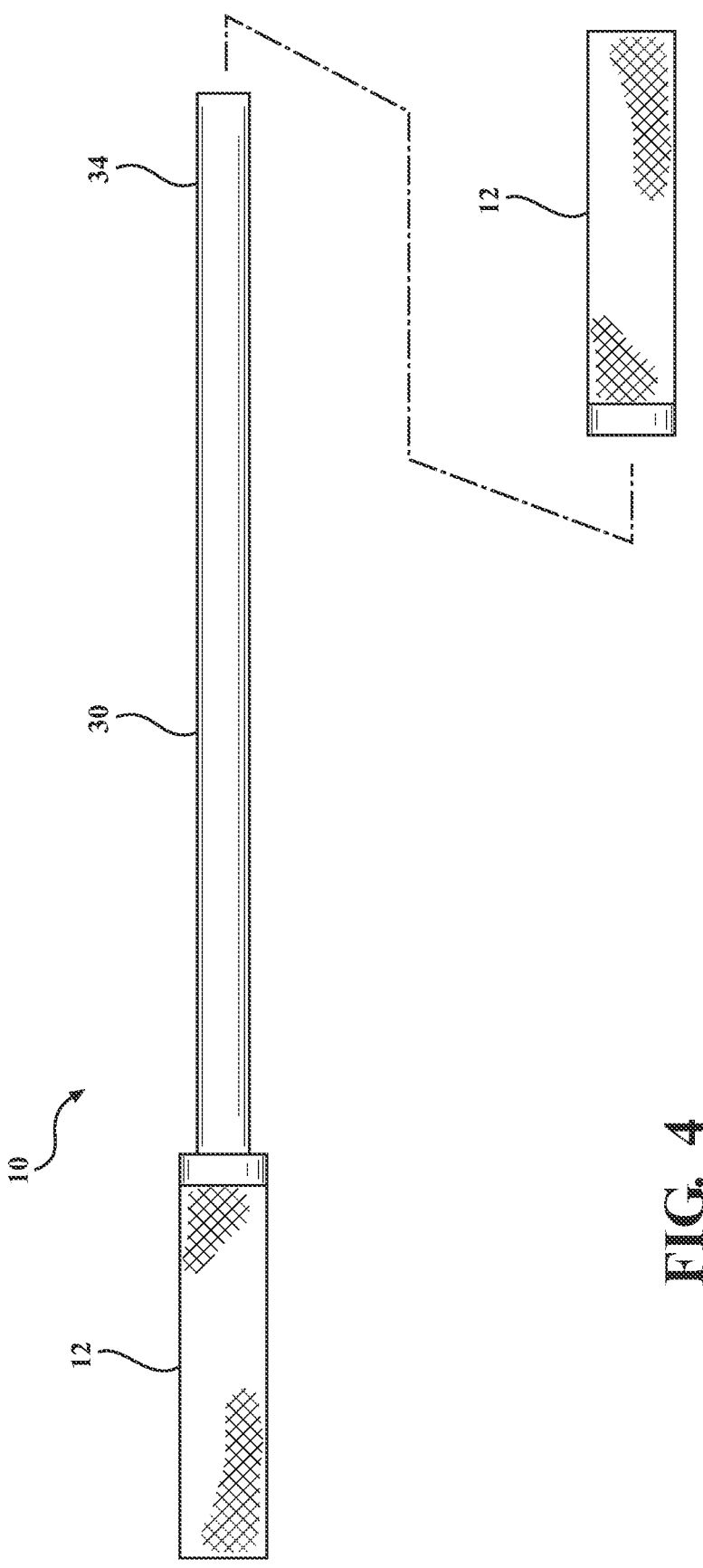
FIG. 4 schematically illustrates the sporting dowel rod of FIG. 1 with one of the handles removed and with the sporting dowel rod being configured as a billy-club, in accordance with the present disclosure.

FIG. 4 schematically illustrates the sporting dowel rod 10 of FIG. 1 with one of the handles 12 removed and with the sporting dowel rod 10 being configured as a billy-club. The sporting dowel rod 10 includes one of the handles 12 secured to a first end of the elongated rod 30, with a second end 34 of the elongated rod 30 exposed. A user may brandish the sporting dowel rod 10 as a billy-club, useful to cull a wounded or partially taken game animal. Subsequent to the animal being culled, the user may install the removed handle 12 to the second end 34 to restore the sporting dowel rod 10 to being useful as an aider for dragging or hanging the game animal.

Figure 5:
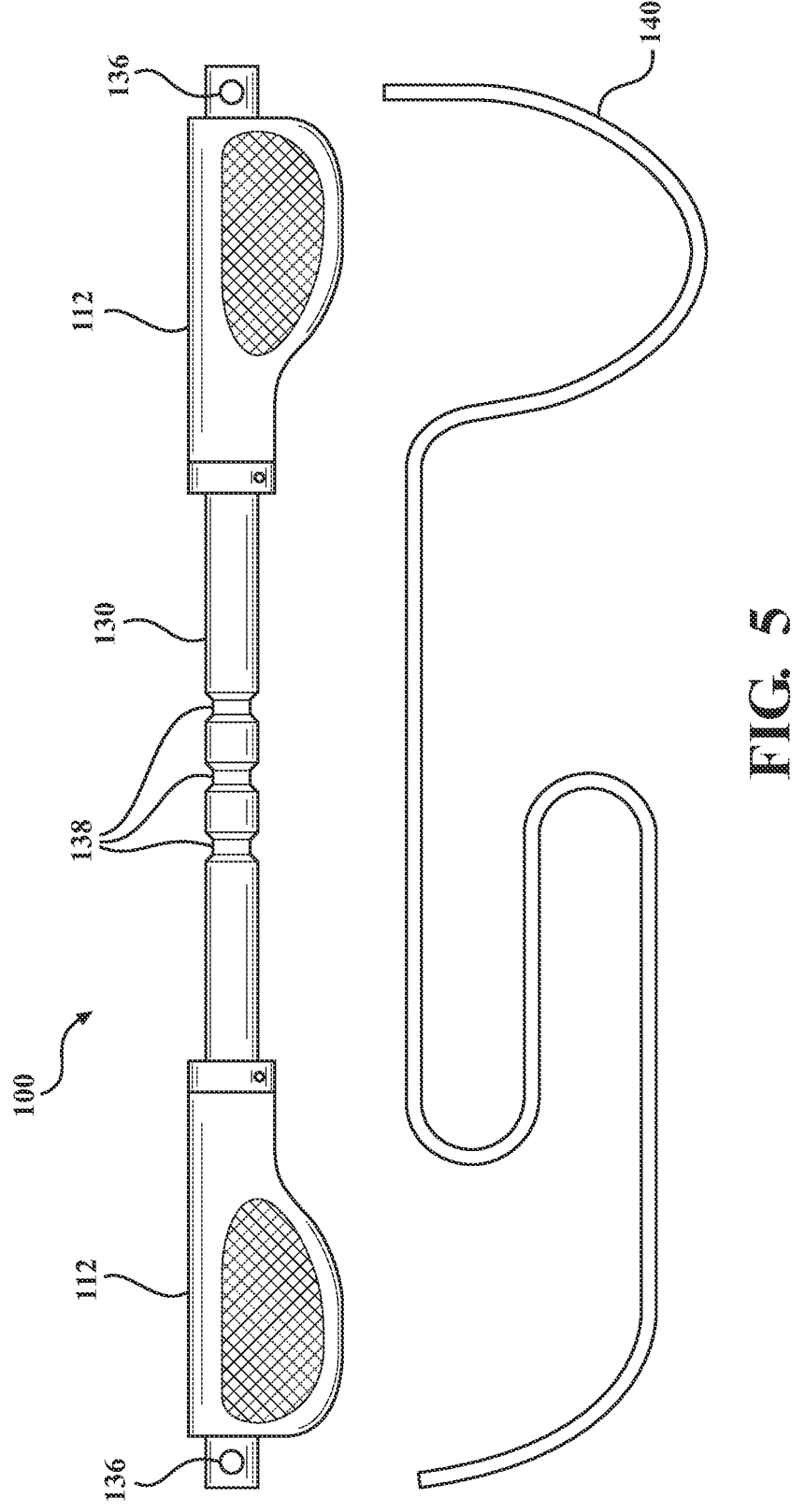
FIG. 5 schematically illustrates an alternative embodiment of a sporting dowel rod, including two ergonomically enhanced handles, two link attachment features, and a cord useful for attachment to a game animal, in accordance with the present disclosure.

FIG. 5 schematically illustrates an alternative embodiment of a sporting dowel rod 100, including two ergonomically enhanced handles 112, two link attachment features 136, and a cord 140 useful for attachment to a game animal, with the sporting dowel rod 100 configured as an aider. Elongated rod 130 is illustrated including a cylinder including a link attachment feature 136 at each end of the elongated rod 130. The link attachment feature 130 may include a through-hole, a hook, a notch, or other similar structure useful to secure a cord 140, a rope, a chain, or other similar attachment link to the elongated rod 130. The elongated rod 130 further includes circumferential gripping features 138 including a plurality of annular depressed rings configured to provide texture such that a user's hand or a tied rope or cord 140 will be less likely to slip from the portion of the elongated rod 130 including the gripping features 138. The handles 112 are illustrated including a curved shape configured to provide an ergonomic interface for the hands of the user. The cord 140 is illustrated and may include any rope, wire, cable, paracord, or other flexible line useful to secure a game animal to the sporting dowel rod 100.

Figure 6:
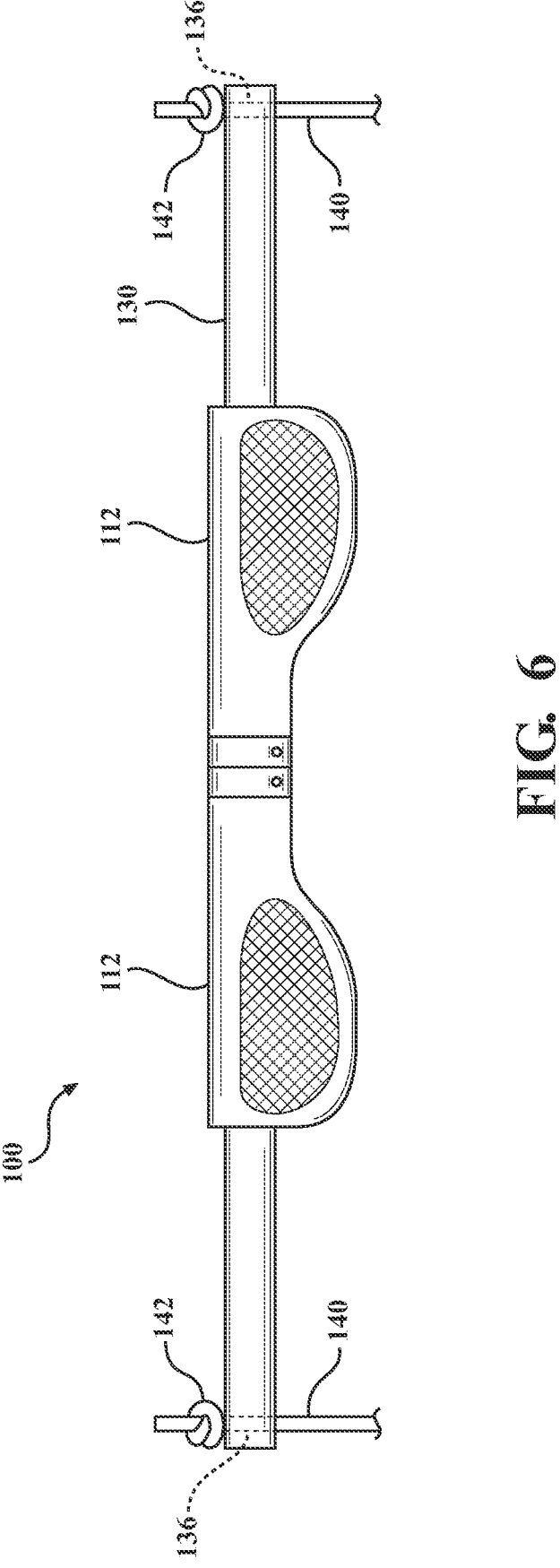
FIG. 6 schematically illustrates the sporting dowel rod of FIG. 5 with the handles moved to an inward location upon the elongated rod and with the cord attached to the two link attachment features, in accordance with the present disclosure.

FIG. 6 schematically illustrates the sporting dowel rod 100 of FIG. 5 with the handles 112 moved to an inward location upon the elongated rod 130 and with the cord 140 attached to the two link attachment features 136. Moving a heavy game animal may be difficult. Forested or mountainous regions may include a difficult trail or brush area through which the game animal may need to be dragged. The location of the handles 112 upon the elongated rod 130 may significantly impact an ease with which the user may apply force to the sporting dowel rod 100 and move the game animal. The handle 112 may be moved; removed, rotated, and reinstalled; rotated; or otherwise manipulated upon the elongated rod 130 to facilitate the user finding an optimal configuration with which to operate the sporting dowel rod. The location of the handles 112 may be adjustable in the middle of being used, for example, with the user using an exemplary hex-key wrench to enable loosening and subsequent re-tightening of the associated constriction bands of the handles 112 depending upon a current task (e.g., dragging an animal on flat ground, lifting the animal over a fallen tree, lifting the animal into a truck bed, etc.) The cord 140 is illustrated attached to the link attachment features 136 with exemplary knots 142. In another embodiment, the cord 140 may include looped ends which may be engaged to hooks or notches on the elongated rod 130.

Figure 7:
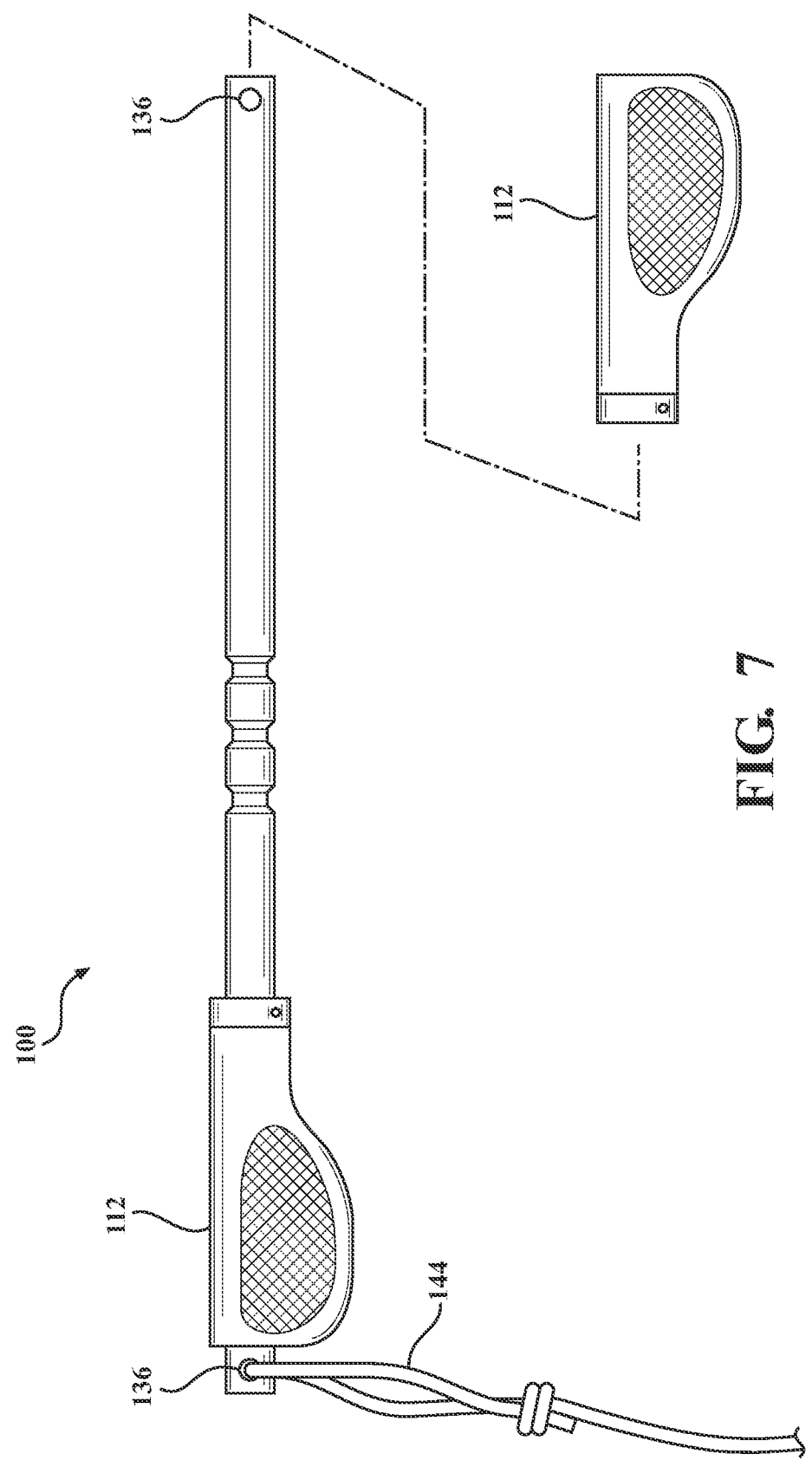
FIG. 7 schematically illustrates the sporting dowel rod of FIG. 5 with one of the handles removed and with the sporting dowel rod being configured as a billy-club, in accordance with the present disclosure.

FIG. 7 schematically illustrates the sporting dowel rod 100 of FIG. 5 with one of the handles 112 removed and with the sporting dowel rod 100 being configured as a billy-club. The sporting dowel rod 100 includes one of the handles 112 secured to a first end of the elongated rod 130, with a second end of the elongated rod 130 including one of the link attachment features 136 exposed. A user may brandish the sporting dowel rod 100 as a billy-club, useful to cull a wounded or partially taken game animal. Subsequent to the animal being culled, the user may install the removed handle 112 to the second end to restore the sporting dowel rod 100 to being useful as an aider for dragging or hanging the game animal.

Figure 8:
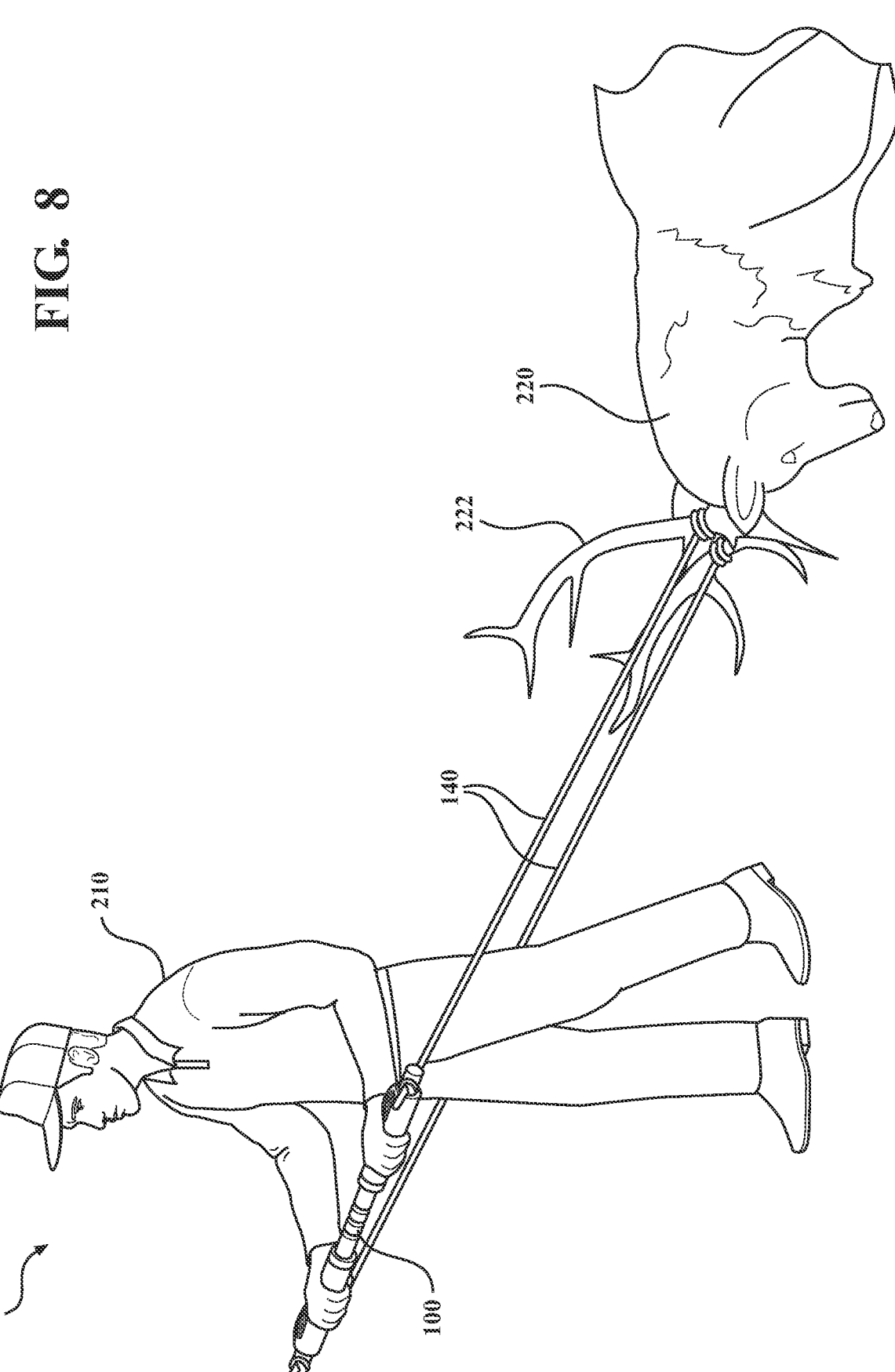
FIG. 8 schematically illustrates the sporting dowel rod being utilized as part of a game animal movement system, in accordance with the present disclosure.

FIG. 8 schematically illustrates the sporting dowel rod 100 of FIG. 5 being utilized as part of a game animal movement system 200. The game animal movement system 200 is illustrated including the sporting dowel rod 100 and the cord 140, with the cord 140 being attached to horns of a taken deer. An illustrated user is illustrated applying force with his or her hands to the handles of the sporting dowel rod 100. Force is transferred through the sporting dowel rod 100, through the cord 140, to the game animal and causes the illustrated deer to move along a ground surface.

Figure 9:
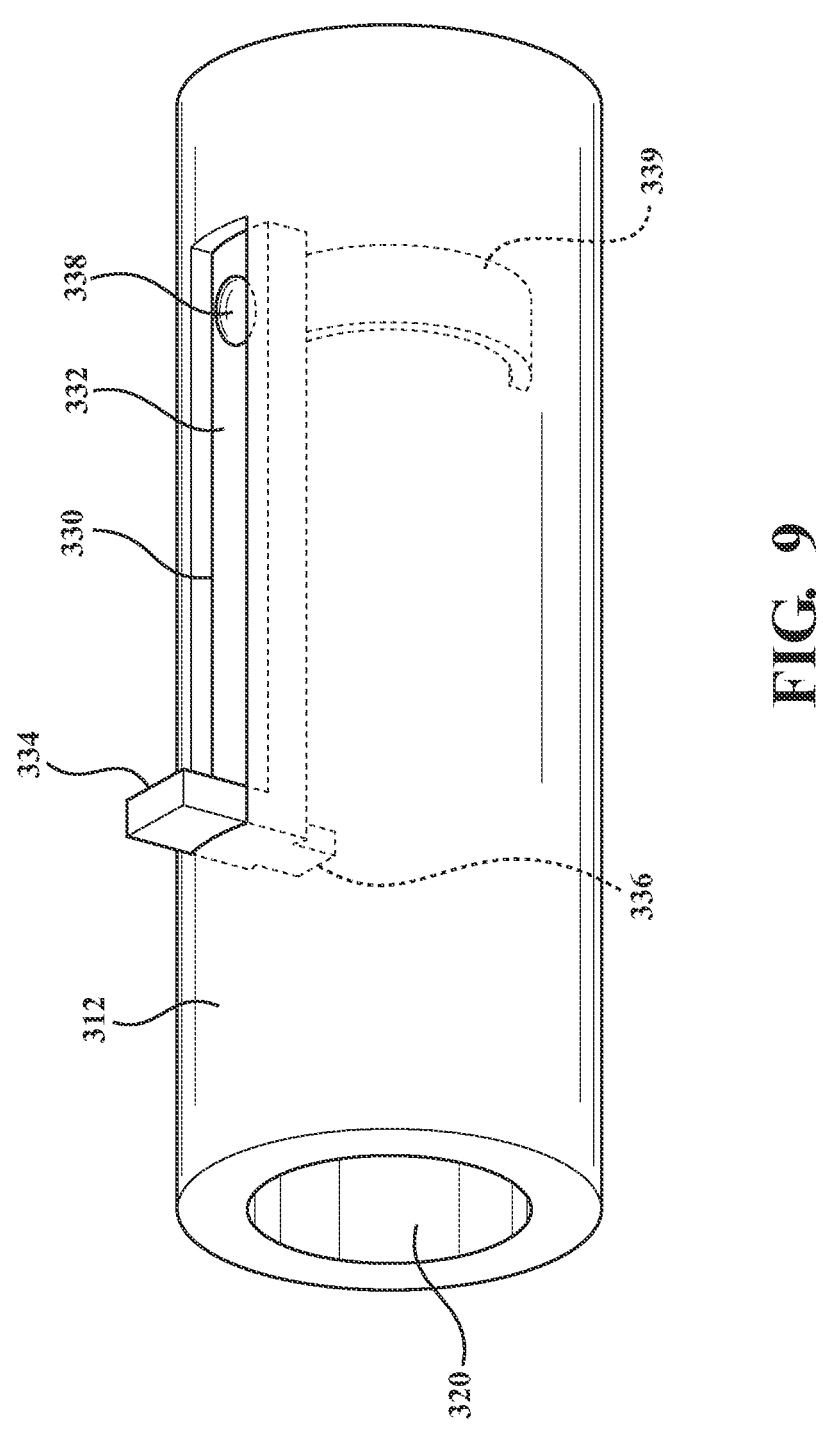
FIG. 9 schematically illustrates an alternative handle configuration for use with the sporting dowel rods of FIG. 1 or 5, in accordance with the present disclosure.

FIG. 9 schematically illustrates an alternative handle 312 for use with the sporting dowel rods 10, 100 of FIG. 1 or 5. The handle 312 includes a hollow central portion 320 useful for receiving an elongated rod. The handle 312 further includes a handle retention clip 330 configured to removably attached the handle 312 to an elongated rod. The handle retention clip 330 includes a spring arm 332 attached with a rivet 338 to a base band 339 configured to be wrapped around an elongated rod of a sporting dowel rod. The spring arm 332 includes a bias to press down upon an elongated rod within the hollow central portion 320. The spring arm 332 includes a retention notch 336 configured to press against an elongated rod within the hollow central portion 320. The elongated rod may include a mating notch or hole configured to receive the retention notch 336. The elongated rod may include a plurality or a series of notches or holes configured to permit the handle 312 to be fixed at alternative locations on the elongated rod. The spring arm 332 further includes an exposed tab 334 configured to enable a user to disengage the retention notch 336 and enable the handle 312 to be moved to a different location. A number of alternative structures for providing a notch in the handle 312 to affix the handle 312 to an elongated rod are envisioned, and the disclosure is not intended to be limited to the examples provided herein.

Figure 10:
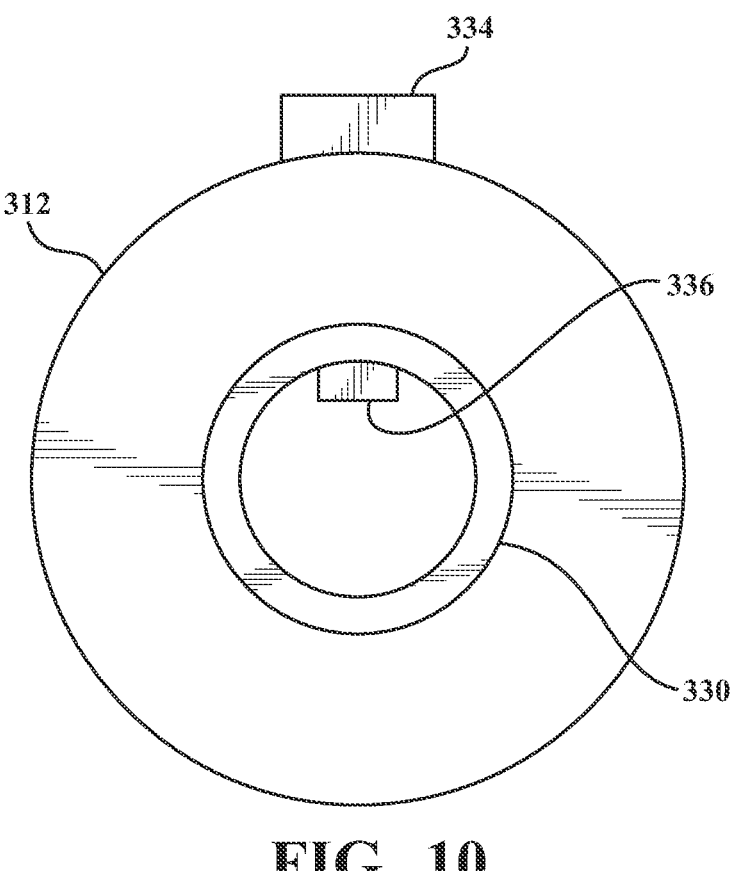
FIG. 10 schematically illustrates the handle of FIG. 9 attached to a hollow elongated rod with a circular cross-section, in accordance with the present disclosure.

FIG. 10 schematically illustrates the handle 312 of FIG. 9 attached to a hollow elongated rod 330 with a circular cross-section. The elongated rod 330 is illustrated with the retention notch 336 illustrated extending through a wall of the elongated rod 330. Exposed tab 334 is illustrated, enabling a user to pull upwards on the exposed tab 334 to disengage the retention notch 336 from the elongated rod 330.

Figure 11:
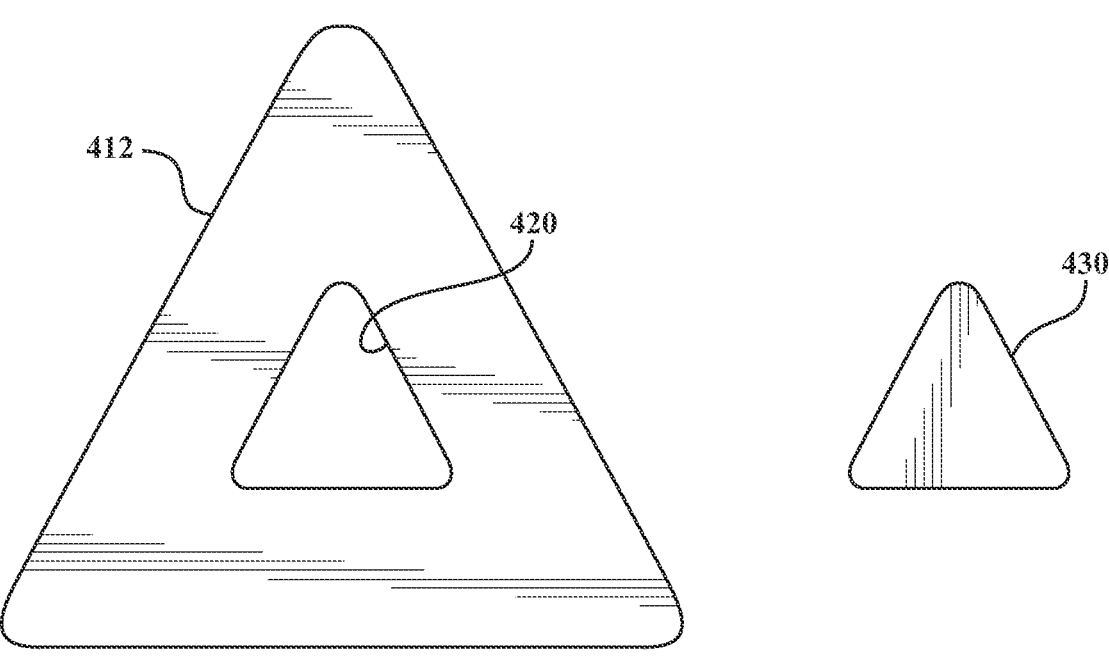
FIG. 11 schematically illustrates an alternative exemplary handle constructed with an elastic material with a triangular cross-section configured to be installed to an elongated rod, in accordance with the present disclosure.

FIG. 11 schematically illustrates an alternative exemplary handle 412 constructed with an elastic material with a triangular cross-section configured to be installed to an elongated rod 430. The handle 412 includes a hollow central portion 420. The hollow central portion 420 is smaller in size than the elongated rod 430, such that the elastic material of the handle 412 may be stretched to fit upon the elongated rod 430. The elastic material stretched over the elongated rod 430 provides a constrictive force upon the elongated rod 430, thereby affixing the handle 412 to the elongated rod 430.

Figure 12:
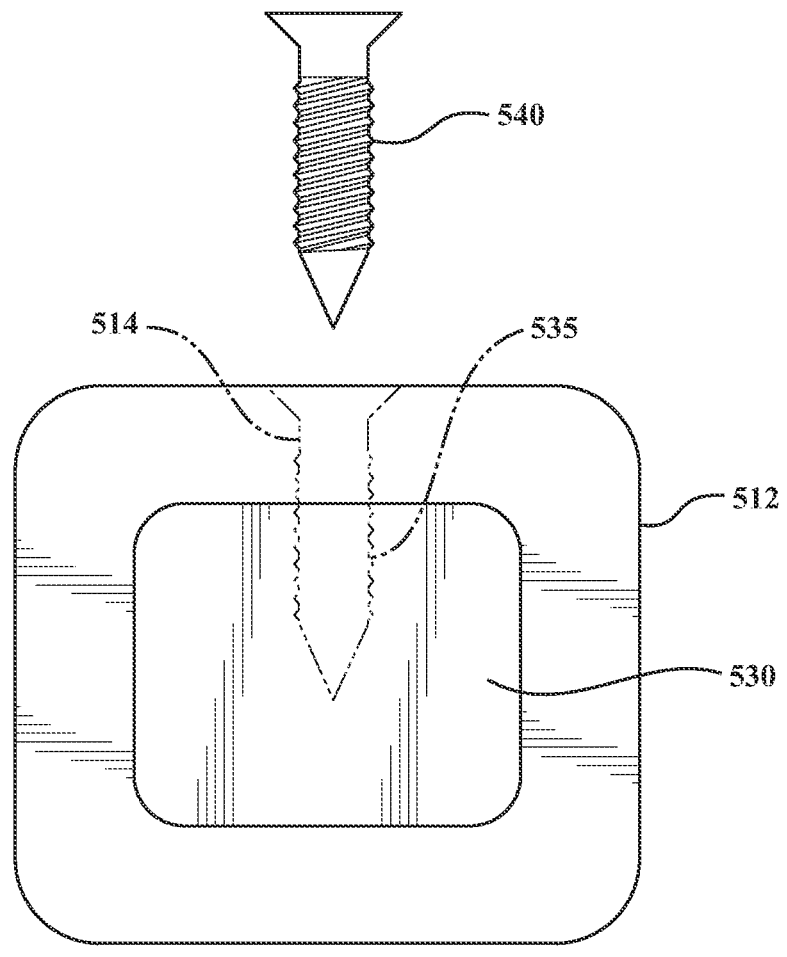
FIG. 12 schematically illustrates an alternative exemplary handle with a square cross-section configured to be connected to an elongated rod with a threaded fastener, in accordance with the present disclosure.

FIG. 12 schematically illustrates an alternative exemplary handle 512 with a square cross-section configured to be connected to an elongated rod 530 with a threaded fastener 540. The handle 512 may be fit over the elongated rod 530. The handle 512 includes a threaded fastener receiving feature 514, and the elongated rod 530 similarly includes a threaded fastener receiving feature 535. The threaded fastener 540 may be utilized to affix the handle 512 to the elongated rod 530.

Figure 13:
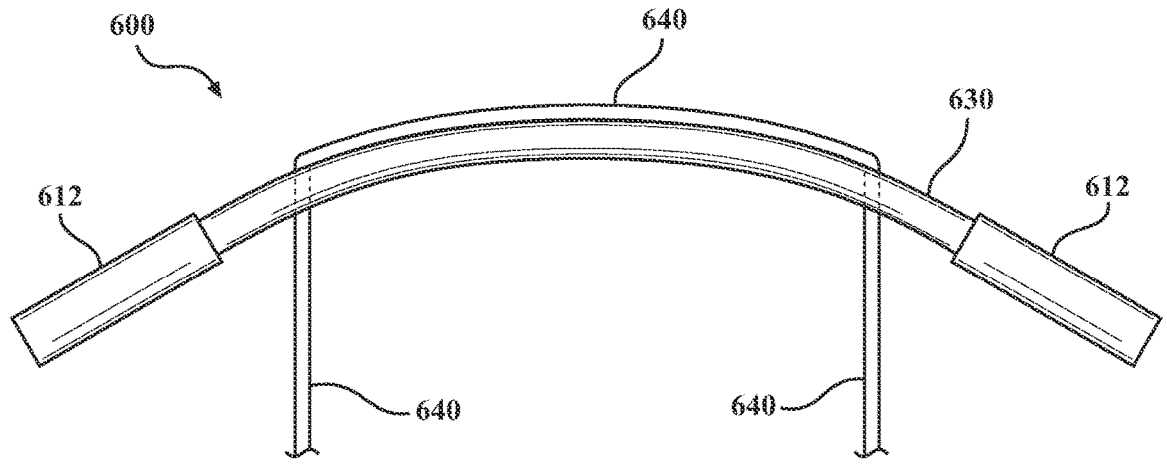
FIG. 13 schematically illustrates an exemplary sporting dowel rod including a curved elongated rod, in accordance with the present disclosure.

FIG. 13 schematically illustrates an exemplary sporting dowel rod 600 including a curved elongated rod 630. The curved elongated rod 630 may include a slight curve or a more extreme curve. Two handles 612 are illustrated affixed to the curved elongated rod 630. A cord 640 is illustrated penetrating the curved elongated rod 630 in two places and running along a top side of the sporting dowel rod 600.

Figure 14:
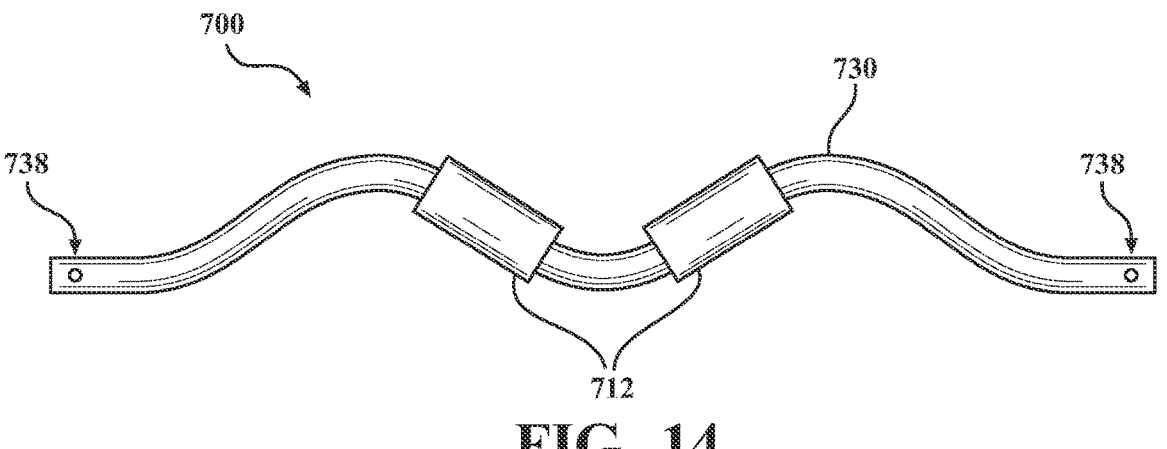
FIG. 14 schematically illustrates an exemplary sporting dowel rod including a knurled elongated rod, in accordance with the present disclosure.

FIG. 14 schematically illustrates an exemplary sporting dowel rod 700 including a knurled elongated rod 730. A knurled bar may be utilized in weightlifting to provide for ergonomic lifting of heavy weights. Similarly, the knurled elongated rod 730 may be utilized to provide for ergonomic lifting of heavy game animals. The knurled elongated rod 730 includes two link attachment features 738 at exemplary ends of the knurled elongated rod 730. In another embodiment, the link attachment features 738 may be located at alternative or additional locations upon the knurled elongated rod. A pair of handles 712 are illustrated permanently welded to the knurled elongated rod 730. In other embodiments, the pair of handles 712 may be removable.

While the best modes for carrying out the disclosure have been described in detail, those familiar with the art to which this disclosure relates will recognize various alternative designs and embodiments for practicing the disclosure within the scope of the appended claims.

What is claimed is:

1. A sporting dowel rod, comprising: an elongated rod including a first end portion and a second end portion distal from the first end portion, wherein the elongated rod is a single-piece monolithic rod; a first handle attached to the first end portion; and a second handle removably attached to the second end portion; and wherein the elongated rod extends through and past at least one of the first handle or the second handle, such that the elongated rod protrudes from both ends of the at least one of the first handle or the second handle; wherein the elongated rod includes a first link attachment feature disposed upon the first end portion and a second link attachment feature disposed upon the second end portion; wherein the sporting dowel rod is configured to operate as an aider to a user for dragging or hanging a game animal when the second handle is attached to the second end portion; and wherein the sporting dowel rod is configured to operate as a billy-club when the second handle is removed from the second end portion.

2. The sporting dowel rod of claim 1, wherein the first handle is removably attached to the first end portion.

3. The sporting dowel rod of claim 1, wherein the first link attachment feature and the second link attachment feature each include a through-hole formed in the elongated rod.

4. The sporting dowel rod of claim 1, wherein the elongated rod includes a circumferential gripping feature including an annular depressed ring formed in the elongated rod.

5. The sporting dowel rod of claim 1, wherein the elongated rod includes one of a circular cross-section, a triangular cross-section, and a square cross-section.

6. The sporting dowel rod of claim 1, wherein the second handle includes a constriction band configured for selectively releasing the second handle from the elongated rod.

7. The sporting dowel rod of claim 1, wherein the first handle and the second handle are each constructed of an elastic polymer.

8. The sporting dowel rod of claim 1, wherein the first handle and the second handle are configured to move along and be selectively secured at a plurality of locations along the elongated rod.

9. A system for dragging or hanging a game animal, comprising: a sporting dowel rod, comprising: an elongated rod including a first end portion and a second end portion distal from the first end portion, wherein the elongated rod is a single-piece monolithic rod; a first handle attached to the first end portion; and a second handle removably attached to the second end portion, wherein the elongated rod extends through and past at least one of the first handle or the second handle, such that the elongated rod protrudes from both ends of the at least one of the first handle or the second handle; and a cord configured for attachment to the sporting dowel rod; wherein the elongated rod includes two link attachment features configured for enabling attachment of the cord to the elongated rod; and wherein the sporting dowel rod is configured to operate as an aider to a user for dragging or hanging a game animal when the second handle is attached to the second end portion; and wherein the sporting dowel rod is configured to operate as a billy-club when the second handle is removed from the second end portion.

10. The system of claim 9, wherein the two link attachment features each include a through-hole formed in the elongated rod.

11. The system of claim 9, wherein the first handle is removably attached to the first end portion.

12. The system of claim 9, wherein the elongated rod includes a circumferential gripping feature including an annular depressed ring formed in the elongated rod.

13. The system of claim 9, wherein the elongated rod includes one of a circular cross-section, a triangular cross-section, and a square cross-section.

14. The system of claim 9, wherein the second handle includes a constriction band configured for selectively releasing the second handle from the elongated rod.

15. The system of claim 9, wherein the first handle and the second handle are each constructed of an elastic polymer.

16. The system of claim 9, wherein the first handle and the second handle are configured to move along and be selectively secured at a plurality of locations along the elongated rod.

17. A method for dragging a game animal, comprising:

connecting a cord to each end of a sporting dowel rod, wherein the sporting dowel rod includes:

an elongated rod including:

a first end portion;

a second end portion distal from the first end portion;

a first link attachment feature disposed at the first end portion; and a second link attachment feature disposed at the second end portion, wherein the elongated rod is a single-piece monolithic rod;

a first handle attached to the first end portion; and a second handle attached to the second end portion, wherein the elongated rod extends through and past the first handle to expose the first link attachment feature past the first handle and through and past the second handle to expose the second link feature past the second handle, such that the elongated rod protrudes from both ends of the first handle and the second handle;

connecting the cord to the game animal; and applying motive force to the game animal through the cord and the sporting dowel rod.

* * * * *